Aug. 5, 1969  D. P. SCOTTO  3,459,395
SHOCK ISOLATING MEANS
Filed Aug. 16, 1967  4 Sheets-Sheet 1
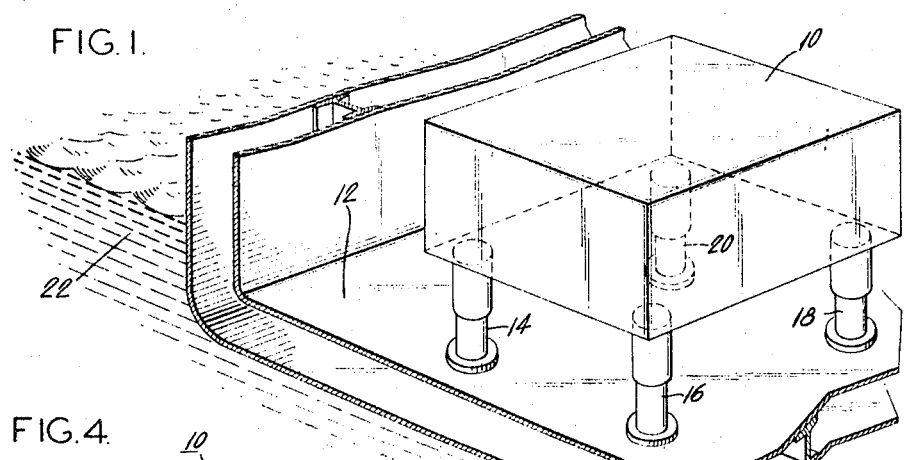
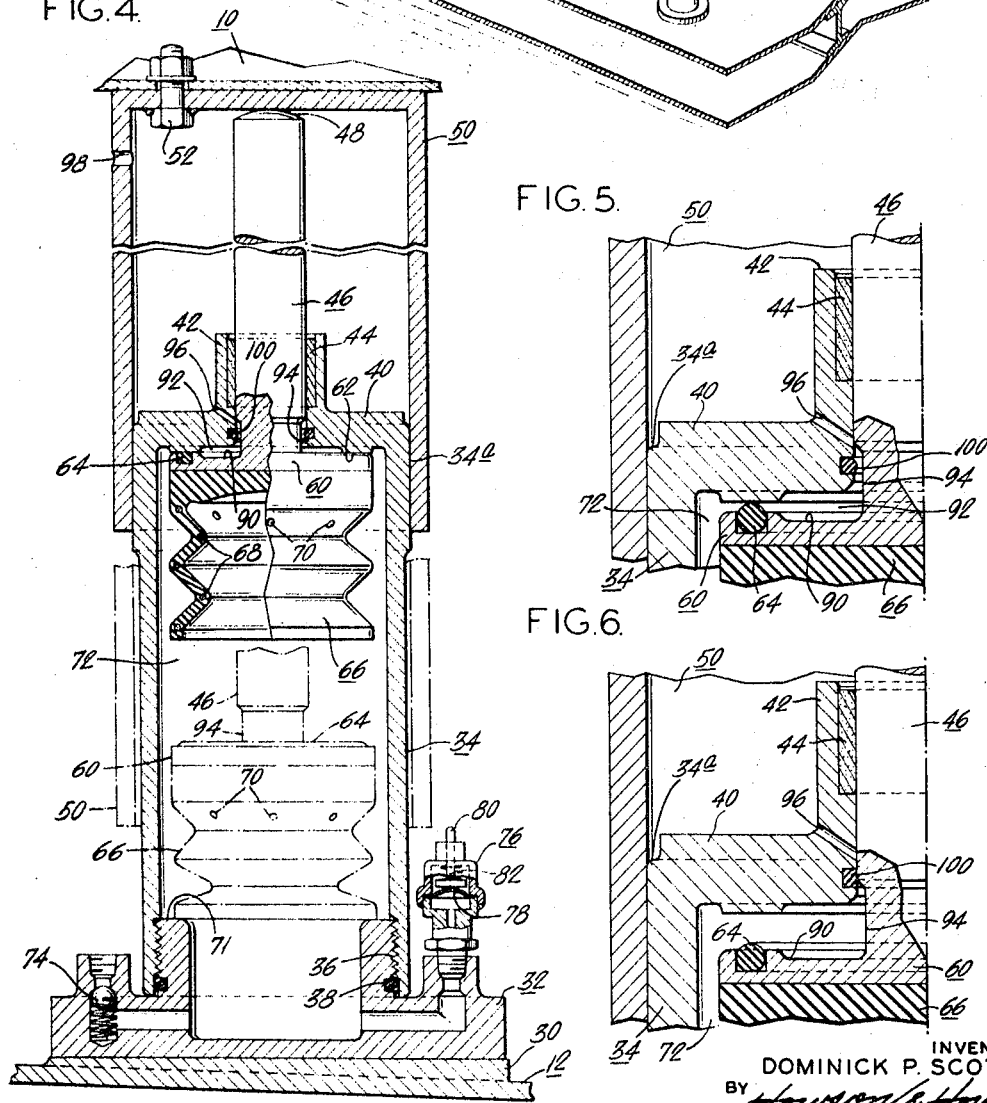
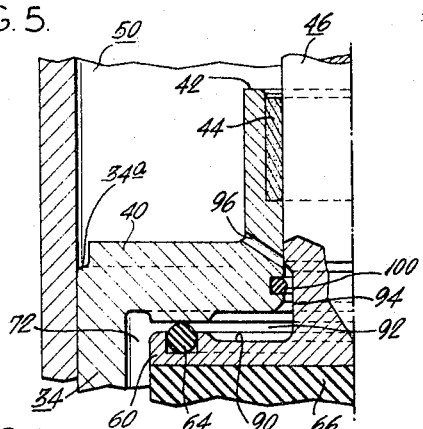
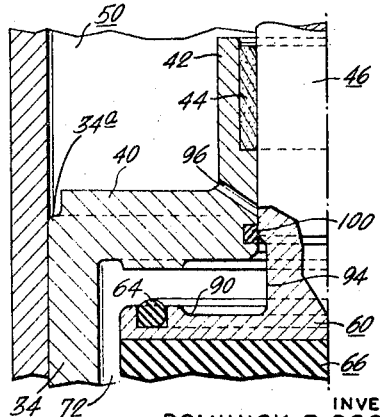
INVENTOR:
DOMINICK P. SCOTTO
BY Howson & Howson
ATTYS.

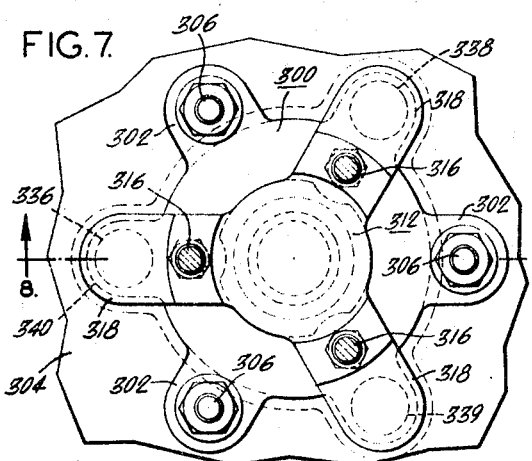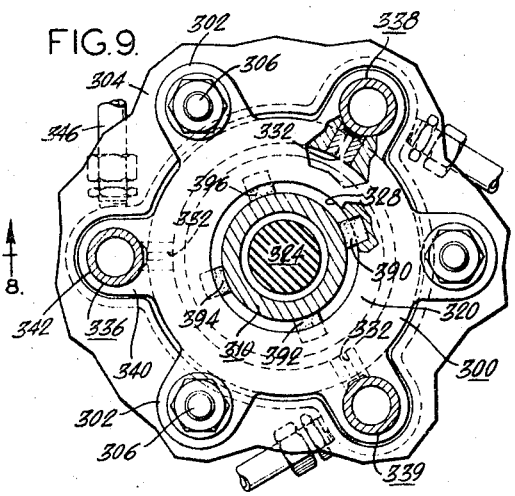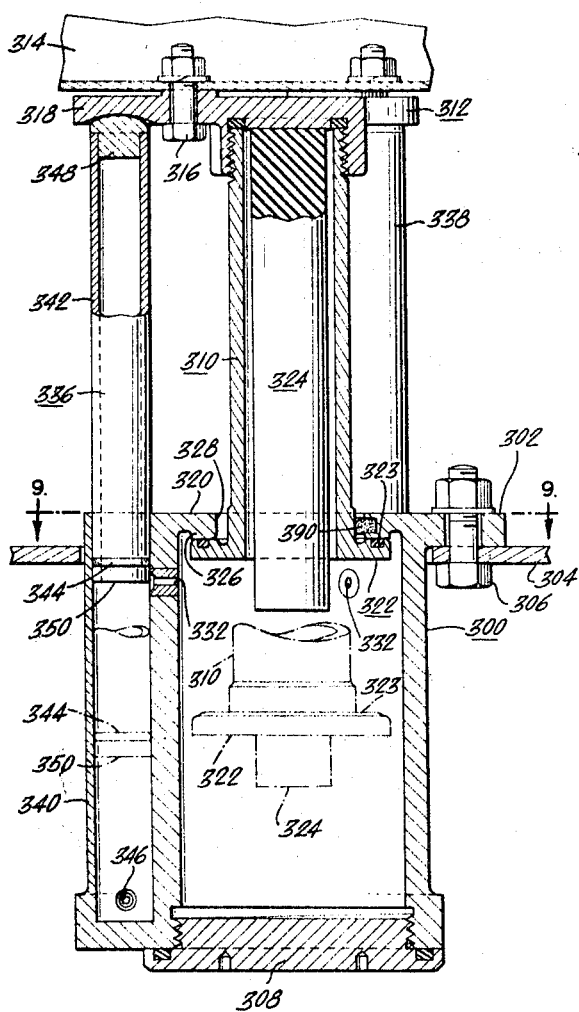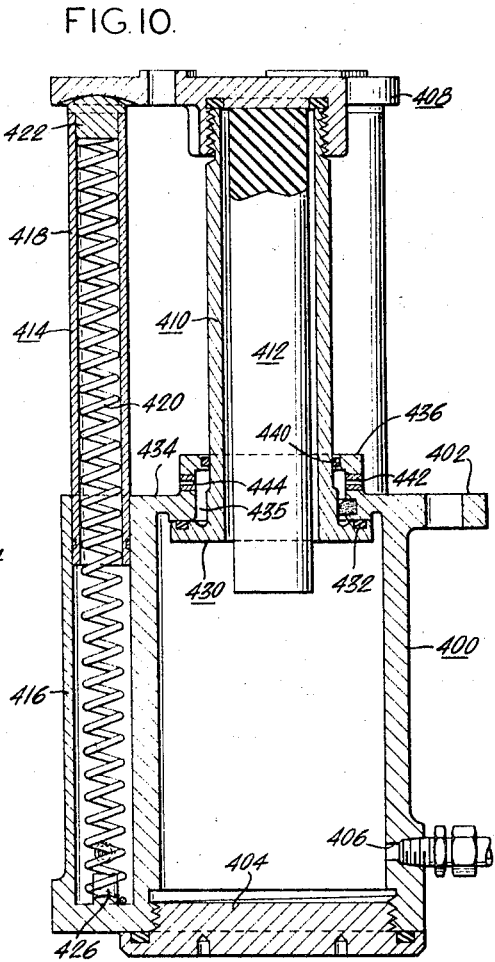

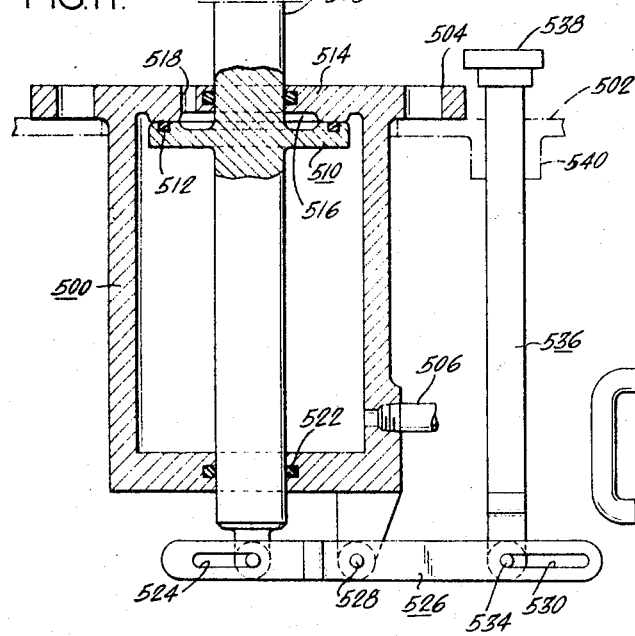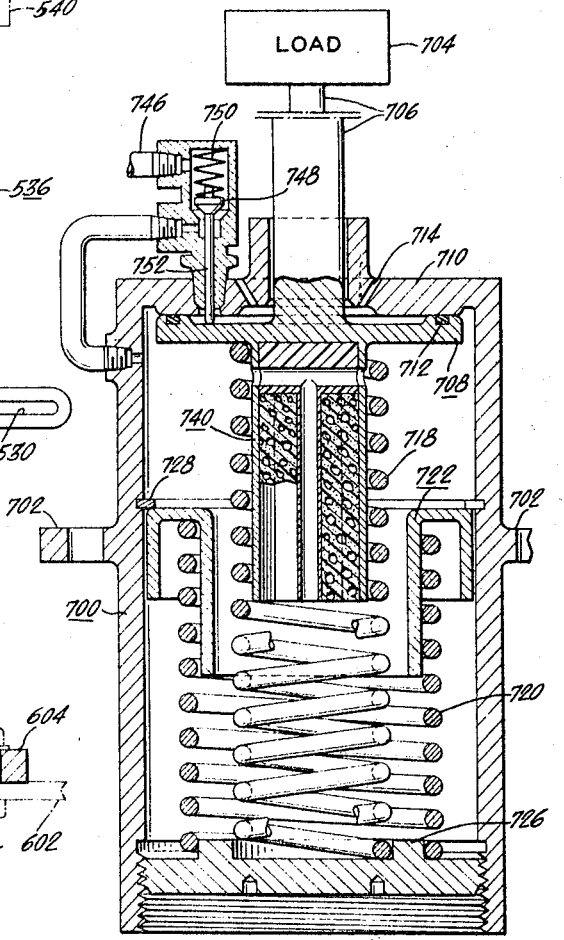

Aug. 5, 1969  D. P. SCOTTO  3,459,395
SHOCK ISOLATING MEANS
Filed Aug. 16, 1967  4 Sheets-Sheet 4
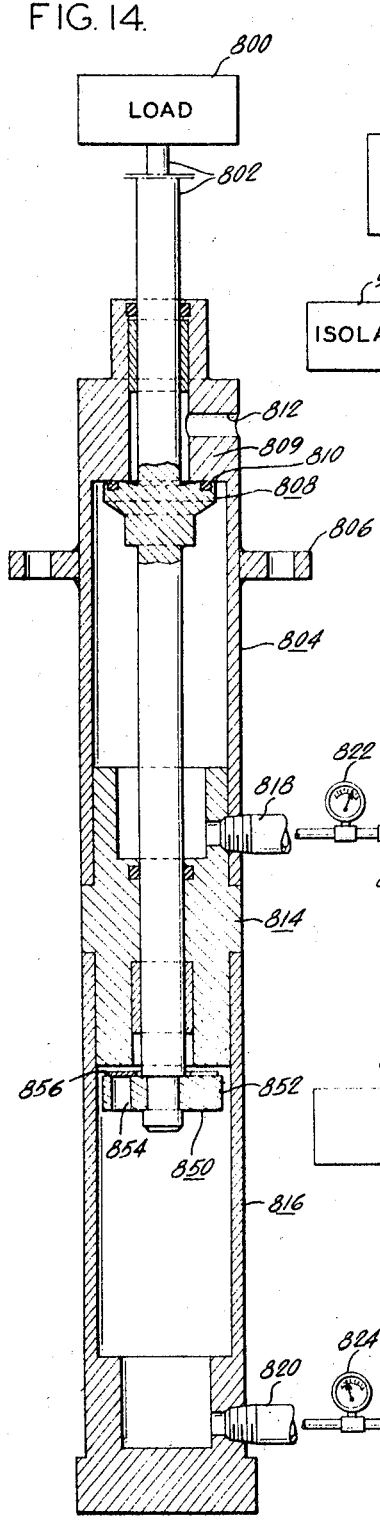
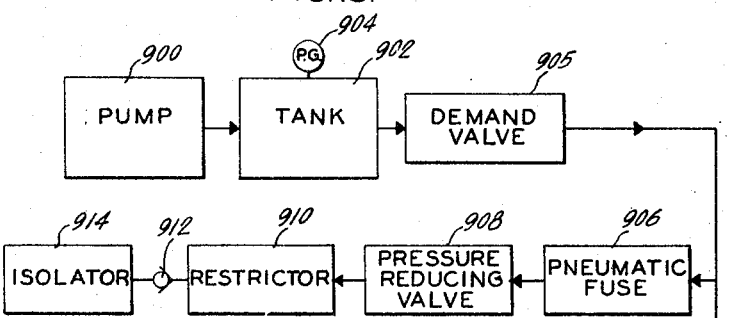
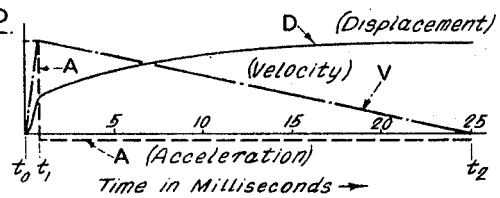
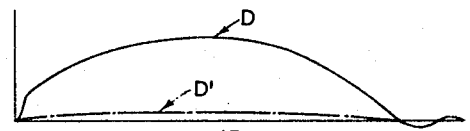
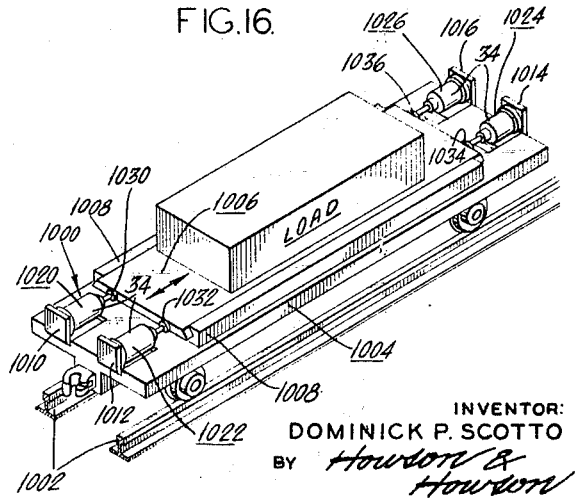
INVENTOR:
DOMINICK P. SCOTTO
BY Howson & Howson
ATTYS.

United States Patent Office 3,459,395
Patented Aug. 5, 1969

3,459,395
SHOCK ISOLATING MEANS
Dominick P. Scotto, Plainview, N.Y., assignor to AMBAC Industries Incorporated, Garden City, N.Y., a corporation of New York
Filed Aug. 16, 1967, Ser. No. 661,056
Int. Cl. F16f 15/00
U.S. Cl. 248—20          25 Claims

ABSTRACT OF THE DISCLOSURE

A shock isolator for minimizing the effects on a load of large mechanical shocks applied to a frame connected to the load, for example to reduce the shock to personnel or equipment on a vehicle subject to shock from beneath, such as a boat near which an underwater explosion has occurred. In one embodiment the load is supported on an easily-reciprocable piston, which is normally coupled by a pressurized pneumatic seal to the side of the frame from which shock is expected, by pneumatic pressure; the seal is preferably between an annular portion of the piston head and an annular portion of a cylinder head fixed to the frame. Shocks of greater than a predetermined minimum magnitude applied to the frame break the pneumatic seal early in the shock period, effectively disconnecting the piston from the frame and from the shock during the remainder of the shock period, and hence isolating the load from most of the shock energy. After the shock is ended, a mechanical or pneumatic return preferably resets the piston to its original position for repressurization.

BACKGROUND OF INVENTION

This invention relates to apparatus for reducing the effect on one member of shock applied to another member coupled thereto.

There are many applications in which an object or frame supporting a shock-sensitive load is subject to sudden strong shock, due for example to an explosion near the frame or to collision between the frame and another object. Various types of shock absorbers have been used in the past to cushion such shocks and prevent or minimize damage to the shock-sensitive load. For example, resilient shock absorbers are known which, in effect, spread out the energy of the shock over a longer period of time and thereby reduce the acceleration applied to the load. Frangible shock absorbers are also known which absorb shock by crumpling.

Each of these classes of known devices has certain limitations and drawbacks well known to those skilled in the art. Without discussing these exhaustively, it may be mentioned that resilient systems have frequency-sensitive characteristics tending to produce undesirable shock amplification or resonances at certain frequencies, which if avoided or minimized by appropriate design tend to require increased spring preloading and added bulk and weight. Frangible systems ordinarily require substantial preloading or initial strength in order to avoid collapse in response to minor or innocuous shocks, and accordingly transmit a substantial amount of shock; in addition, such a frangible system is not readily adjustable, and normally is destroyed by a single shock and hence not effective against a subsequent shock without repair or replacement.

One application, but not the only one, of the apparatus of the invention is in reducing shocks to persons or objects on a boat exposed to underwater explosions. Such an explosion typically causes a very large, brief, upward acceleration of the bottom of the boat during the resultant shock, followed immediately by a strong downward acceleration of the boat due to air pressure and related effects. This produces a whip-like action tending to throw equipment and personnel violently upward with respect to the boat. Accordingly, not only is there possible damage to equipment and personnel due to the initial sharp upward acceleration, but, due to the whip-like action, personnel may be thrown violently against overhead structures or even overboard, secured equipment is subjected to high stresses, and loose objects may become dangerous projectiles. In such an application it is particularly desirable that any apparatus used to minimize the effects of shock be effective against very strong but brief shocks, that it be small, light and inexpensive, applicable to a large range of applications, and preferably capable of repeated operation in response to successive large shocks without requiring extensive resetting or reconditioning procedures.

Accordingly it is an object of the invention to provide new and useful apparatus for reducing the transmission of mechanical shock.

Another object is to provide such apparatus which is effective against brief shocks of very high magnitudes.

A further object is to provide such apparatus which is capable of repetitive operation without requiring extensive resetting procedures.

Another object is to provide such apparatus which resets and reconditions itself automatically in preparation for subsequent large shocks.

It is also an object to provide such apparatus which is readily adjustable to vary the strength of shock for which the apparatus comes into operation.

Another object is to provide such apparatus which is relatively small, light and inexpensive.

It is also an object to provide new and useful apparatus for reducing the effects of an underwater explosion on objects or persons on board a vessel near the source of said explosion.

An additional object is to provide the latter type of apparatus in a form in which it is adapted to operate effectively and efficiently in response to a series of relatively closely time-spaced shocks, and/or is readily adjustable to accommodate various magnitudes of explosion and of ambient shock levels.

SUMMARY OF THE INVENTION

The above objects are achieved by the provision of new and useful apparatus in which a first member is normally connected to a second member by normally-pressurized seal means to cause said first member to move in response to motion of said second member; means are also provided which are responsive to forces in excess of a predetermined minimum magnitude applied to said second member to open said seal means and permit easy relative motion between said members.

In a preferred form of the invention, the effects on a load of severe shock applied to the supporting frame for the load are minimized by providing a member for supporting the load which is mounted for easy movement with respect to the frame but is normally constrained to move with the frame by pressurized pneumatic seal means disposed between the frame and the movable means. However, during the initial portion of a shock of more than a predetermined minimum magnitude applied to said frame, the frame moves sufficiently with respect to the movable member to open the pneumatic seal and thereby disengage the movable member and the load from the frame during the remainder of the shock. The load is thereby isolated from the frame during the remaining portion of the shock and the adverse effects of the shock on the load thereby greatly reduced.

More particularly, in prefererd forms of the invention the movable member supporting the load has a portion extending along the side of the supporting frame to which shock components are to be applied, and is capable of easy motion with respect to the supporting frame along the direction of the shock components which are to be minimized, from a first position in which said portion of said member bears against a surface fixed to said side of the frame to a second position in which said portion is spaced from said surface; preferably the movable member comprises a reciprocable piston having a pneumatic sealing portion providing a seal between said piston and said surface fixed to the frame when the piston is in said first position. Means are provided for applying pneumatic pressure to the member when the member bears against said surface to urge the member against the surface, and for reducing said pressure when the frame is caused to carry said surface away from the member in response to the initial portion of said shock component of predetermined minimum magnitude applied to the frame.

In a preferred embodiment, the pressure-applying means comprises a pressurizable chamber communicating with said piston on one side of said sealing portion thereof so that pressure in said chamber urges the piston against said surface fixed to said frame when the piston is in said first position; when acceleration of the frame due to shock opens the seal, the pressurizing gas flows rapidly behind the sealing portion to reduce the differential pressure on the piston suddenly and thereby release it for easy reciprocatory motion with respect to the frame. The pneumatic pressure applied to the piston in said first position thereof is sufficient to hold said member against said surface fixed to said frame during any shock the component of which along said direction is substantially less than said predetermined magnitude, so that the load-supporting member is not freed from the frame for such lesser shocks.

Preferably said member and said surface fixed to said frame are shaped adjacent the seal to facilitate rapid flow of the pneumatic pressurizing gas through the seal region when the seal is first broken, thereby to assure rapid freeing of the piston from the frame as early as possible during the shock.

As a further feature of the preferred form of the invention, return means are provided for urging said member toward said first position, after said seal has been broken, with a force sufficient to return it to said first position in the absence of shock. Preferably this force is insufficient in itself to hold said member against said surface fixed to said frame during shock components along said direction which are substantial but smaller than said predetermined minimum magnitude, but is sufficient to do so in combination with said pneumatic pressure. In this way the member is automatically reset, after it has been freed from the frame by one shock, in preparation of a subsequent shock, but the restraint on said member during the portion of the shock period in which it is isolated from the frame is minimized.

As a further feature of the preferred embodiment, means are preferably provided for maintaining one side of the pneumatic seal at atmospheric pressure when the movable member bears against said surface of said frame and for minimizing the rate of exhaust of pressurized gas when the member moves away from the said service. In some embodiments this means may comprise a small, continuously-open aperture extending from the unpressurized side of said seal to atmosphere; preferably, for some applications, valve means are employed which are responsive to motion of the movable member with respect to the frame to connect said unpressurized side of said seal to atmosphere when said movable member bears against said surface fixed to said frame, and to block connection of said unpressurized side to atmosphere when said movable member moves away from said surface. This enhances the rapidity with which the movable member is freed from the frame and thus reduces the shock transmitted to the load.

DESCRIPTION OF FIGURES

Other objects and features of the invention will be more readily understood from a consideration of the following detailed description, taken together with the appended drawings, in which:

FIGURE 1 is a schematic perspective view illustrating one application of the apparatus of the invention;

FIGURES 2 and 3 are graphical representations to which reference will be made in explaining the operation of, and the problem solved by, certain forms of apparatus in accordance with the invention;

FIGURE 4 is an elevational sectional view of one embodiment of the invention;

FIGURES 5 and 6 are enlarged fragmentary views, in section, of a portion of the apparatus of FIGURE 4 for two different positions of the load-bearing piston thereof.

FIGURE 7 is a plan view of another embodiment of the invention;

FIGURE 8 is an elevational view, in section, taken along lines 8—8 of FIGURE 7;

FIGURE 9 is a sectional view taken along lines 9—9 of FIGURE 8;

FIGURE 10 is an elevational view, in section, of another embodiment of the invention;

FIGURES 11, 12, 13 and 14 are elevational views in section of four other embodiments of the invention;

FIGURE 15 is a schematic block diagram of a system useful in supplying pressurized air to various embodiments of the invention; and FIGURE 16 is a schematic perspective view illustrating further how the invention may be used in another application.

DETAILED DESCRIPTION OF PREFERRED EMBODIMENTS

Referring to FIGURE 1, there is illustrated schematically therein one of numerous applications for the shock isolator of the invention. A load 10, which may be an enclosure or a platform for supporting shock-sensitive equipment and/or personnel for example, is supported on the flat interior bottom surface 12 of the double-bottomed hull of a boat by means of four shock isolators 14, 16, 18 and 20, the boat being afloat upon a body of water 22. Assume now that the bottom of the boat is subjected to a severe upwardly-directed accelerative force, such as may be due to a nearby explosion, the shock from which is transmitted through the water to the underside of the boat. It has been found that this will produce a substantially vertical upward shock on the bottom of such a boat.

FIGURES 2 and 3, though not necessarily to scale, are illustrative of certain of the effects of such a shock upon the bottom of the boat, which would be transferred to the load 10 were it rigidly mounted to the bottom of the boat rather than by way of the shock isolators shown. Curve A of FIGURE 2 is an idealized plot, against time in milliseconds, of the ecceleration to which the bottom of the boat would be subjected in a typical case. For the duration $t_0$ to $t_1$ of the applied shock, the acceleration has an extremely high value, for example as high as 1,000 g. At the time $t_1$ when the applied shock is over, the acceleration typically assume a substantial negative value many times greater than 1 g., for example $-60$ g., due to the effects of air and water pressure on the boat; this substantial negative acceleration is shown in idealized form as continuing at a constant value until the time $t_2$, when it terminates. The resultant velocities of the bottom of the boat, plotted against time, are shown by the curve V of FIGURE 2. As shown, during the interval $t_0$ to $t_1$ the velocity increases very rapidly and substantially linearly to a peak at the end of the shock interval, and then decreases substantially linearly toward zero during the longer interval $t_1$ to $t_2$. Curve D of FIGURE 2 illustrates the upward displacement of the boat in response to the accelerations illustrated. During the shock interval $t_0$ to $t_1$, the displacement increases rapidly and at an increasing rate in the positive direction, until the time $t_1$. At the time $t_1$ the displacement begins to increase at a slower and decreasing rate, reaching a peak at time $t_2$ and decreasing thereafter. Curve D of FIGURE 3 is a plot against time of the displacement of the boat, showing its return to zero displacement followed by some oscillation about the zero position as it settles down into the normal position.

It is noted that not only is the boat subjected to a severe accelerative shock during the interval $t_0$ to $t_1$, but also that there is an upwardly-directed tossing effect at the time $t_1$, as shown by any of the three curves of FIGURE 2. For example, the velocity graph V shows an abrupt change at time $t_1$ from an increasing upwardly-directed velocity to a velocity which decreases many times more rapidly than if only the gravitational acceleration of 1 g. were operating on the boat. Any objects not fastened down to the boat will, at the time $t_1$, tend to continue upward with the relatively high velocity reached at $t_1$ subject only to the deceleration due to gravity, while the boat is moved downwardly in response to a high negative acceleration, such as —60 g. Thus if load 10 comprises an enclosed chamber containing unsecured personnel and equipment, both will tend to fly upwardly relative to the chamber and against the top thereof, while if the chamber is open at the top or in effect comprises a platform, the personnel or equipment may be thrown overboard.

The shock isolator of the invention, when used for each of the shock isolating mounts 14, 16, 18 and 20 of FIGURE 1 or when used singly to support a smaller load, greatly mitigates the effects of such severe shock upon a load such as 10. While some initial upward shock is generally transmitted to the load when the shock isolator of the invention is used, and while some later-occurring shocks may be applied to the load by the inherent operation of certain forms of the isolator, the effects of the shock on the load are reduced many-fold, for example by at least 10 to 1 as represented by the displacement curve D' in FIGURE 3 for a load protected by such an isolator.

More particularly, with reference to the embodiment of the invention shown in FIGURES 4, 5 and 6, the boat hull 12 is provided with any necessary leveling shim 30 for mounting the shock isolator with its axis vertical. The shock isolator comprises a base 32 rigidly secured to hull 12 by any convenient arrangement of bolts and plates (not shown). A metal cylinder 34 is mounted upright on base 32 by means of mating screw threads on the base and cylinder as shown at 36. An O-ring 38 is preferably provided at the lower end of the thread to provide pneumatic sealing thereof. Cylinder 34 is imperforate except for certain openings, to be described hereinafter, in the head 40 of the cylinder.

Head 40 of cylinder 34 is provided with an upwardly-extending cylindrical protrusion 42 which houses a guide bushing 44 in which a cylindrical piston rod 46 is supported for easy reciprocating motion along a vertical direction. Piston rod 46 is provided at its upper end with a convex surface 48 bearing against the undersurface of the top of a telescoping cylinder 50, which fits slidably but closely over the outer machined surface of cylinder 34 at 34A. The load 10 is secured by bolts such as 52 to the top of telescoping cylinder 50 so that upward motion of piston rod 46 raises load 10 and downward motion of piston rod 46 permits the load 10 to fall substantially freely in the downward direction for a substantial travel distance.

Piston rod 46 is provided at its lower end with a piston head 60 extending along the interior lower side of the cylinder head 40. A raised annular sealing boss 62 is provided on the undersurface of cylinder head 40 which mates with a corresponding annular sealing surface on the top of piston head 60 provided in this case by a protruding resilient O-ring 64. Accordingly, when piston rod 46 is in its uppermost position the O-ring 64 bears against the undersurface of cylinder head 40 to provide a pneumatic seal between the inner and outer sides of the O-ring.

In this example there is also employed an overtravel buffer 66 in the general form of a bellows. Buffer 66 may be made of a wide-temperature-range, high-internal-damping molded elastomer reinforced with steel rings such as 68. A plurality of orifices 70 are provided through the buffer 66, spaced circumferentially around an upper side-portion thereof. Accordingly, should piston rod 46 travel downwardly with respect to cylinder 34 to an extent sufficient for the buffer 66 to strike the shoulder 71 of base 32 as shown in dotted line in FIGURE 4, the energy of any additional motion in this direction will be absorbed by the resilience of the buffer; preferably the lower surface of the buffer makes an air-tight seal to shoulder 71 when urged against it. The orifices 70 provide substantial resistance to the passage of air therethrough so as to provide a damping effect and a more gradual arresting of the piston rod, and also provide sufficient bleeding of air through the bellows so that the air trapped in the bellows will not produce an overly-severe upward bounce of the piston rod.

The interior of the cylinder 34 comprises a chamber 72 which communicates at its lower end with a pressurizing check valve 74 to which an air hose, for example, may be applied to pressure chamber 72 when needed. A pressure gauge 76 is preferably also employed in communication with chamber 72, in this example comprising a snap-type diaphragm member 78 for raising a pressure-indicating rod 80 against the pressure of a spring 82 only when the pneumatic pressure in chamber 72 is in the desired operating range.

Piston head 60 comprises an annular relieved region 90, interior of the O-ring 64, which forms with the adjacent relieved undersurface of cylinder head 40 a small chamber 92. Immediately above chamber 92, piston rod 46 has a reduced diameter portion 94 extending upwardly to a point slightly above a bleed orifice 96 whereby, in the position shown in FIGURE 4, communication is provided between smaller chamber 92 and the interior of telescoping cylinder 50, and thence by way of opening 98 to the exterior atmosphere. A self-energizing O-ring seal 100 is provided in cylinder head 40 immediately below the orifice 96 and extending sufficiently inwardly that, when piston rod 46 moves sufficiently downwardly, the larger diameter portion thereof forms a pneumatic seal with O-ring 100 to block communication between bleed orifice 96 and chamber 92.

The latter arrangement and operation are shown more clearly in FIGURES 5 and 6. In FIGURE 5 the condition is shown in which piston rod 46 has moved sufficiently downwardly that the seal between O-ring 64 and cylinder head 40 is just beginning to open, whereby pressurized air from chamber 72 can flow rapidly behind the piston head and into the small chamber region 92. For a brief instant some of this air will also be able to flow outwardly by way of bleed orifice 96 and opening 98. However, as shown in FIGURE 6, slight further downward motion of piston rod 46 causes the larger-diameter portion of the latter rod to make a sealing contact with O-ring 100, thereby blocking communication with bleed orifice 96 and preventing loss of pressurized air. It will be understood that the dimensions in FIGURES 5 and 6 are not necessarily to scale, and in practice the dimensions are preferably made such that only a very small downward motion of piston rod 46 is necessary to seal-off bleed orifice 96.

In the operation of the embodiment shown in FIGURES 4, 5 and 6, with the shock isolator initially depressurized the buffer 66 will rest in the position shown in dotted line in FIGURE 4. By applying an air hose from a suitable pressure source to the check valve 74, the chamber 72 is pressurized sufficiently to raise the piston rod 46, piston head 60 and buffer 66 to the position shown in full line in FIGURE 4. This raising of the assembly will occur because, with chamber 72 pressurized above atmospheric pressure, there will be an unbalanced upwardly-directed reset force on the entire piston assembly substantially equal to the product of the excess of pressure in chamber 72 above atmospheric and the cross-sectional area of piston rod 46 where it passes through the sealing ring 100. The excess pressure and rod cross-sectional area are preferably only sufficiently great to assure raising of the piston rod against the weight of telescoping cylinder 50 and of the load which is supported by cylinder 50 and to assure the forming of a seal between the piston head and cylinder head. If desired, where a plurality of such isolators are utilized to support the load as shown in FIGURE 1, an air-pressure manifold may be provided interconnecting the several shock isolators so that they can all be pressurized at the same time and in the same manner to produce an even raising of the load 10.

When the piston assembly has been raised to its uppermost position, a pneumatic seal will be produced at O-ring 64, and bleed orifice 96 will be open to atmosphere. Accordingly, the pressure in the smaller chamber 92 will be substantially atmospheric and the piston head will be urged upwardly against the lower surface of cylinder head 40 with a force substantially equal to the excess above atmospheric of the pressure in chamber 72 multiplied by the cross-sectional area of the seal provided by O-ring 64. The resultant net upward force on the piston assembly constitutes the preload which maintains the seal despite substantial shocks of less than a predetermined value which may be applied upwardly against the bottom of base 32 but which can be tolerated by the load. However, this preload is such that when shocks greater than a predetermined magnitude are applied against base 32 in the upward direction, the cylinder 34 moves suddenly upward and away from sealing ring 64, as illustrated in FIGURES 4 and 5, so that air from chamber 72 can flow through the seal region into smaller chamber 92 thereby equalizing the pressure on both sides of piston head 60 and releasing it from cylinder head 40 so it is free to move easily and with little restraint other than gravity along the vertical direction. To enhance the rapidity of this release, the peripherally-outward and peripherally-inward edges of the piston head and of the cylinder head in the region of the seal are preferably rounded and shaped to diverge in either direction from the seal, thereby to enhance the rate of flow of air into the region behind the piston head.

This rapid release of the piston assembly from the cylinder 34 occurs early in the shock period $t_0$ to $t_1$ of FIGURE 2, so that for most of the duration of the severe shock the cylinder 34 is accelerated upwardly while the piston assembly and load 10 are essentially floating freely, the —1 g. acceleration of gravity being balanced by the reset force. Thus while a certain upward impetus is given to the load during initial portions of the shock, this impetus is relatively small and tolerable. The general form of the motion of the load 10 when protected by the shock isolator of the invention is therefore of the general nature shown by curve D' of FIGURE 3, from which it can be seen that the amount and rate of displacement, and the tossing effect, are greatly reduced, improvements of better than 10 to 1 being readily obtainable.

The exact positional realtionship between the piston assembly and the cylinder 34 during and immediately after a severe shock will depend upon the nature of the shock and the various time constants of the particular embodiment of shock isolator used. In some cases, the downward motion of the cylinder 34 after the shock is ended will cause the cylinder head 40 to overtake the piston head 60, causing it to be reset and to reseal. With other dimensional relationships the piston head 60 will remain essentially free of the cylinder head 40 until the effects of the shock are completely finished, and will be reset by effects of pneumatic pressure descirbed preivously in connection with the initial setting of the piston head. Where the amount of shock produced on the load during reset would be undesirably large, appropriate damping of the reset motion may be provided, as shown for example in other embodiments disclosed herein.

It will be understood that, in this application, the distance between the lower end of buffer 66 and the shoulder 70 on base 32 is selected to provide a length for free travel of piston rod 46 which is greater than the expected maximum upward excursion of base 32 in response to expected severe shocks. Accordingly buffer 66 does not, in this case, bottom on shoulder 70 during the normal use for which it is designed, but is merely a safety deivce for unusual or unexpected conditions.

With the particular arrangement of FIGURE 4 in which the enlarged portion of the diameter of piston rod 46 acts as a valve in connection with O-ring 100, the isolator can be operated repetitively a large number of times in response to successive shocks without repressurizing of chamber 72 from external sources. This is because the loss of air from chamber 72 on each cycle of opeartion consists only of the small amount of leakage which may occur at the onset of separation of the piston head from the cylinder head, before the bleed orifice 96 is closed by downward motion of piston rod 46, together with loss of the small volume of air contained in smaller chamber 92, which air is dumped once for each operation of the isolator. The arrangement is therefore economical of pressurized air, and hence need not be connected to a compressor or storage tank but may merely be pressurized occasionally by portable equipment, after which it is in condition for a large number of repetitive cycles without recharging.

Without in any way thereby limiting the socpe of the invention, the following is an example of one set of structural and operating parameters which may be used in the embodiment of FIGURE 4 to protect a load on a boat from the effects of sever underwater shocks.

Total useful load _____ 300 lbs.
Weight of remainder of reciprocable
  structure _____ 10 lbs.
Upward shock required to release piston head:
  When first pressurized _____ 11 g.
  After 100 operations _____ 9 g.
Maximum length of piston stroke __ 5″.
Effiective piston rod diameter _____ 1″.
Cross-sectional area of piston rod __ 0.785 in.²
Piston head seal cross-sectional area _ 7.85 in.²
Pressure in chamber 72:
  Before first operation _____ 420 p.s.i.
  After about 50 operations _____ 380 p.s.i.
Inner diameter of cylinder 34 _____ 3.5″.
Total volume of "dumping" chamber _____ 0.1 in.³
Bleed orifice 96 _____ 3 orifices at 120°, each of about .007″ diameter.

It will be understood in connection with this and other embodiments that, broadly speaking, the term "frame" may be applied not only to the large underlying support for the movable load-bearing member but also to any parts fixedly secured to this underlying support, which always move with the support and hence may be considered as part of the frame.

In the embodiment illustrated in FIGURES 7, 8 and 9, the valve arrangement associated with the piston assembly is omitted in the interest of simplicity of fabrication and the return of the piston head to its set position is accomplished pneumatically, by means of pneumatic chambers separate from the main preload pressure chamber.

More particularly, a cylindrical preload chamber 300 is provided near its top with three equiangularly-spaced peripherally-extending ears 302 which may be secured to the deck or other frame 304 by suitable bolts 306. The bottom of the cylinder 300 in this case is closed by a threaded and pneumatically-sealed plug 308. The piston rod 310, in this case a hollow cylinder, is screw-threaded into, and pneumatically sealed to, an upper pedestal 312 on which the load 314 is mounted by suitable bolts 316 which pass through another set of three equiangularly-spaced, peripherally-extending ears 318. The lower end of piston rod 310 extends through the head 320 of cylinder 300 and is provided with a flange-like piston head 322 extending along the underside of cylinder head 320 and provided with a sealing O-ring 323 which mates against a flat annular boss 326 on the underside of cylidner head 320 when piston rod 310 is in its uppermost position. A buffer rod 324 of resilient material within, and coaxial with, piston rod 310 is secured to a lower surafce of pedestal 312 and extends downward below the lower end of piston head 322, so that should the piston rod overtravel downwardly the buffer rod 324 will strike against the upper surface of base 308 and cushion the resultant shock.

An annular clearance channel 328 is provided between piston rod 310 and cylinder head 320 so that, when piston head 322 moves appreciably downward in response to severe shocks, air under positive pressure is preload cylinder 300 can escape readily around the piston to atmosphere. Three openings 332 are provided through the sidewalls of cylinder 300, at equiangular positions thereabout near the top thereof, for purposes to be described hereinafter. Also spaced equiangularly about the vertical axis of the shock isolator are three pneumatic reset columns 336, 338 and 339, which are identical to each other and hence only that designated 336 will be described in detail. Column 336 consists of a lower pneumatic cylinder 340 fixed with respect to cylinder 300, and an upper telescoping pneumatic cylinder 342 which slides vertically within cylinder 340. An O-ring 344 provides a seal between the inner wall of cylinder 340 and the outer wall of cylinder 342 to prevent air leakage. The upper end of cylinder 342 includes a sealing plug 348, preferably of a hard material having a convex upper surface which fits into a correspondingly curved recess in the underside of the pedestal 312 so as to minimize transmission of horizontal forces between pedestal 312 and cylinder 342. Upper pneumatic cylinder 342 has a length such that its lower end 350 just permits communication by way of opening 332 between the interior of lower cylinder 340 and the interior of main preload chamber 300 when upper cylinder 342 is in its uppermost position. A pressurized-air inlet arrangement 346 is proivded near the lower end of the bottom cylinder 340 for permitting pressurizing of the latter cylinder, and may include a suitable check valve.

In operation, pressurized air is applied through the pressurized air inlet 346 and acts against the upper pneumatic reset cylinder 342 to urge it upwards, which also urges piston head 322 into sealing relation with the lower side of cylinder head 320. The other reset columns 338 and 339 act similarly to column 336, the upward force provided by the three pneumatic reset columns being sufficient to move the movable assembly and the load upward to the position just described, but not greater than is necessary to assure that such resetting will occur in all cases. When the reset columns reach their uppermost position, the openings 332 permit the pressurized air to enter preload cylinder 300 and establish the desired upwardly-directed preload force on the underside of the piston head to hold it against cylinder head 320 except when the cylinder head is subjected to severe upward shocks of more than a predetermined minimum magnitude.

When such a severe shock of greater than said predetermined minimum magnitude is applied to the frame 304, it is transmitted directly to preload cylinder 300 in sufficient intensity to move the preload chamber 300 upwardly with respect to piston rod 310 so that the seal between piston head 322 and cylinder head 320 is broken. The piston rod 310 and the load mounted thereon are thereby at that time freed from the frame, except to the extent that they are supported by the reset columns such as 336. Piston rod 310 and the load therefore move downwardly with respect to the frame 304 after the initial portion of the severe shock. This closes-off the openings 332 so that unnecessary air loss does not occur around piston head 322, and so that the pressure is maintained in the reset columns 336, 338 and 339. The air in columns 336, 338, 339 acts like a spring in that it is compressed somewhat during the initial downward motion of piston rod 310 and immediately thereafter tends to drive the piston head 322 upward again into contact with the undersurface of cylinder head 320. To absorb the shock which may occur on such resetting, four small blocks or sprags 390, 392, 394, 396 are provided in loosely-fitting recesses in cylinder head 320, spaced about piston rod 310 at equal angles and adjacent thereto. Each of these blocks may be generally cubical in form but with the upper edge nearer the piston rod surface beveled at 45°. The lower end of piston rod 310 is provided with a peripherally-enlarged region such that the radially-inward sides of the blocks contact the outer surface of the enlarged portion of the piston rod. These blocks slide easily over the surface of the piston rod when the cylinder 300 initially moves upward, but, during reset when the piston rod is moving upwardly with respect to cylinder 300, the blocks tilt to provide a restraining frictional force which produces a mechanical damping to minimize the reset shock. This form of damping apparatus is illustrated in simplified form for convenience of description, it being understood that more elaborate sprag arrangements, or entirely different forms of damping, may be used if desired.

FIGURE 10 shows another embodiment of the invention, which is similar to that shown in FIGURE 8 with the principal exceptions that the reset is produced by mechanical springs instead of pneumatic columns, the preload pressure is supplied directly to the preload cylinder, and the air which is released around the piston head when the piston head moves downwardly with respect to the frame is constrained to escape to atmosphere only by way of small apertures of predetermined dimensions which are sufficiently large to permit the maintaining of atmospheric pressure at the upper side of the piston head when the piston head is in its uppermost position but small enough to prevent excessive loss of air from the preload cylinder when the piston head moves downwardly in response to severe shocks.

More particularly, in FIGURE 10 the cylinder 400 is mounted on the supporting frame by means of ears such as 402 and is closed at its bottom end by threaded plug 404. Pressurized air is admitted to the interior of cylinder 400 by way of air inlet 406, which may include a check valve. An upper pedestal 408 for supporting the load is again connected to a piston rod 410 extending downwardly therefrom and which is in the form of a hollow cylinder containing a resilient buffer rod 412 for cushioning overtravel. Again, three reset columns such as 414 are provided, each comprising a lower cylinder such as 416 and an upper cylinder such as 418 which telescopes easily within lower cylinder 416.

The columns such as 414 are provided to reset the piston rod 410 in its uppermost position, but instead of utilizing pneumatic pressure for this purpose a compression spring such as 420 is mounted in each column, extending from the bottom thereof to the lower side of the closure plugs such as 422 at the top thereof; plugs 422 bear against the correspondingly-curved undersurface regions of the pedestal 408. Each of the springs, at its bottom end, preferably surrounds an upwardly-extending locating pin such as 426 to retain the spring in position. The total upward force provided by the three springs is just sufficient, in the absence of shock, to return the piston rod 410 and the load mounted thereon to its uppermost position.

The preload provided by the pneumatic pressure in preload cylinder 400 acts upwardly against piston head 430, causing the sealing ring 432 thereof to bear against the undersurface of cylinder head 434 and to hold it in this sealed position except upon the occurrence of upwardly-directed severe shocks applied to cylinder 400 in excess of a predetermined minimum magnitude.

A clearance channel 435 is again provided about piston rod 410 in the region where it passes through cylinder head 434, but the region on the upper side of the piston head is enclosed by a cylindrical enclosure or manifold 436 integral with cylinder head 434 and provided with an O-ring 440 for producing a seal to the outer surface of the piston rod. Four small, equiangularly-spaced apertures such as 442 and 444 are provided through enclosure 436 and are of a cross-sectional dimension chosen to permit proper bleeding to atmosphere of enclosure 436 while minimizing leakage of pressurized air to the atmosphere when the seal between piston head 430 and cylinder head 434 is broken by downward movement of piston rod 410. Because of the small diameters of these apertures, the equalization of pressure on the upper and lower sides of piston head 430 occurs generally more rapidly than in the type of construction shown in FIGURE 8, in which appreciable differential pressure remains across the piston head until the pressure in the main preload chamber has been substantially reduced by exhaust to atmosphere around the piston head. Quicker release of the piston head from the cylinder and less transmission of shock to the load is therefore achieved by the arrangement of FIGURE 10. Typical diameters for the apertures are about 0.005 to 0.010 inch.

It will be understood that various features of the three embodiments thus far described in detail may be interchanged and permuted to form an apparatus best suited for any particular application. For example, the embodiments of FIGURES 4, 8 and 10 utilize, respectively, valve-controlled communication between the upper side of the piston head and atmosphere, large-aperture fixed communication between atmosphere and the upper side of the piston head, and small-aperture communication between atmosphere and the upper side of the piston head, and, also respectively, utilize reset by pneumatic pressure in the preload chamber, reset by pneumatic pressure in one or more chambers separate from the preload chamber, and reset by mechanical spring. Any one of these piston head arrangements may be utilized with any one of the reset mechanisms described.

FIGURE 11 illustrates schematically another simplified embodiment of the invention in which reset is accomplished mechanically by a foot-operated lever assembly. In this case there is again employed a main preload cylinder 500 mountable to a frame 502 by a flange 504, to the interior of which cylinder pressurized air is supplied by an air inlet 506, which may include a check valve. The piston rod 508 is provided with a piston head 510 within the cylinder 500, and has a sealing O-ring 512 on its upper surface for mating with the undersurface of the preload cylinder head 514. A small chamber 516 is provided by the relieved upper surface of the piston head and the relieved lower surface of the cylinder head, and is vented to atmosphere by means of a relatively large opening 518. The piston rod 508 supports the load 520, and in this embodiment extends completely through the preload cylinder 500, i.e. it extends through the bottom of cylinder 500 to the exterior by way of an appropriate sealing O-ring 522.

The arrangement thus far described is similar in general principle to the embodiments previously set forth, with the exception that no arrangement is provided for automatic resetting of the piston head against the cylinder head. Because piston rod 508 extends completely through the preload cylinder 500, the pressure in the preload cylinder does not provide any resetting force. Accordingly, in this example the lower end of piston rod 508 is secured slidably in a slot 524 in lever bar 526, which is pivoted about a pivot pin 528 fixed with respect to cylinder 500. The opposite end of lever bar 526 is provided with a slot 530 which retains a driving pin 534 positioned at the lower end of an operating plunger 536, the upper end of which plunger is provided with a pedal 538 for foot operation downwardly along a vertical direction in guide bushing 540.

In operation of the arrangement of FIGURE 11, the piston head remains sealed to the cylinder head in the presence of ordinary minor shocks, but is caused to move downwardly relative to the cylinder head upon the occurrence of severe shocks of more than a predetermined magnitude, sufficiently to permit air in preload cylinder 500 to escape through opening 518, thus releasing the piston rod 508 and load 520 for free fall independently of the motion of frame 502. Upon the cessation of the effects of the severe shock, the piston head is reset by pressing downwardly upon the pedal 538, which causes lever bar 526 to rotate clockwise, thereby raising the piston rod 508 until piston head 510 seals itself against cylinder head 514, after which the air pressure in cylinder 500 retains the piston head in its sealed position and the preload pressure is built up again. This form of the invention has advantages primarily in the simplicity of construction and flexibility of design for various applications.

FIGURE 12 illustrates schematically another embodiment of the invention in which the preload cylinder 600 is again secured to the supporting frame 602 by appropriate ears and bolts such as 604 and 606, respectively. The load 608 is again supported on a piston rod 610 which extends downwardly through support rod guide 612 in cylinder head 614 and which is provided at its lower end with a piston head 616 having a sealing O-ring 618 positioned to mate with a corresponding annular boss on the lower side of cylinder head 14. The piston head and cylinder head are relieved on both the inner and outer sides of the sealing ring 618 to provide for more rapid air flow through the seal region when the piston head 616 moves downwardly relative to cylinder 600 in response to severe shocks.

Venting of the upper side of the piston head to atmosphere is provided by apertures 617 in the cylinder head. Overtravel protection is provided by a resilient buffer rod 620 secured to the bottom of cylinder 600, positioned to be impacted by the lower central portion of piston head 616 should the piston head travel sufficiently downwardly. Reset of the piston head to its uppermost position is produced by a compression coil spring 622 acting between the bottom of cylinder 600 and the lower surface of piston head 616. The spring 622 is relatively weak, i.e. has just sufficient strength the return the piston rod 610 and the associated piston assembly parts and load 608 to their uppermost position in the absence of shock. The preload is again provided by positive pneumatic pressure in cylinder 600.

Pressurization of cylinder 600 is provided from a pneumatic supply inlet 630, acting through a check valve arrangement 632 and a poppet valve arrangement 634. Poppet valve 634 is normally set in its downward, closed position by means of a compression spring 636, but is moved to its open, more upward position by a peripheral portion of piston head 616 when the piston head is in its uppermost position. When poppet valve 634 is open, a passage for air is provided to the interior of cylinder 600 by way of bore 640 in the poppet valve stem. When piston head 616 first moves downwardly in response to severe shock, spring 636 causes poppet valve 634 to close, thus shutting off the supply of air to cylinder 600 and thus permitting rapid reduction of the pressure in cylinder 600 by flow through the vent apertures 617 above the piston head. To avoid shocks upon resetting of the piston head 616 against the lower surface of the cylinder head 614, piston rod 610 is provided with an enlarged portion 642 which fits closely the adjacent inner cylindrical surface of cylinder head 614. With this arrangement, return of the piston head to its uppermost position will be immediately preceded by entrance of the enlarged-diameter portion 642 of piston rod 610 into the closely-fitting portion of cylinder head 614, with the result that the return or reset stroke is viscously damped and the reset shock reduced.

FIGURE 13 illustrates another embodiment, in which the preload cylinder 700 is provided with mounting flanges such as 702 for mounting to the frame and supports a load 704 by way of piston rod 706. The lower end of the piston rod again has a piston head 708 normally pneumatically sealed to the undersurface of the cylinder head 710 and maintained in this position by preload air pressure in cylinder 700 despite the occurrence of minor shocks. Piston-head sealing is provided by O-ring 712, and venting of the upper side of the piston head to atmosphere is provided by apertures 714. Reset is again provided by means of a mechanical compression spring 718. The air-pressure inlet means, the overtravel buffer arrangement and the support arrangement for reset spring 718 are different than in the embodiment of FIGURE 12.

More particularly, overtravel is cushioned in this embodiment by means of a buffer spring 720, which is mechanically preloaded to provide a more constant buffer force, and which surrounds concentrically the reset spring 718. An annular buffer-spring retainer 722 is positioned between the interior walls of preload cylinder 700 and the outside of reset spring 718 to retain, and provide support for, the buffer spring. The lower end of the buffer spring is positioned by an annular boss 726 at the bottom of the cylinder 700. A preload ring 728 held in a recess in the inner wall of cylinder 700 above spring retainer 722 maintains the buffer spring under a preload compression at all times. Should downward overtravel of piston rod 706 occur, the lower surface of piston head 708 will strike against the top of spring retainer 722, causing the buffer spring 720 to compress somewhat absorbing the resultant shock. Again, the design of the system is preferably such that this contact does not occur, the buffer spring being merely a safety arrangement for protection in unusual circumstances.

To provide support for reset spring 718, a lightweight cylindrical guide member 740 may be fastened, as by cementing, to the bottom of piston head 708, coaxial with the piston rod and the reset spring 718. This guide member fits with small clearance within the inner diameter of reset spring 718. The guide 740 is preferably lightweight and porous, and may for example comprise a thin outer plastic cylinder having longitudinally-extending radially-segmented sections filled with lightweight porous plastic filler.

The pressurizing gas inlet 746 in this embodiment supplies air to the interior of cylinder 700 by way of a poppet valve 748. Poppet valve 748 is closable in response to action of spring 750 to prevent pressurizing of cylinder 700, but is held open by stem 752 and piston head 708 when the piston head is in its uppermost position. Accordingly air pressure is supplied to the interior of cylinder 700 when needed to establish preload force, but supply of pressurized air is cut off by downward motion of poppet valve 748 when piston head 708 is caused to move downwardly with respect to the cylinder head 710 in response to severe shocks; this cutting off of the air supply permits rapid reduction of the pressure inside cylinder 700 when piston head 708 moves away from cylinder head 710 and thereby more rapidly frees piston rod 706 and load 704 from connection to the supporting frame.

FIGURE 14 illustrates another embodiment of the invention possessing the advantages of being all-pneumatic, so that regulation of all pressures can readily be made, and of providing separate control of the reset and preload pressures so that a given apparatus can be used in a variety of applications without requiring change of the physical structure thereof. In this case the load 800 is again supported on a piston rod 802 for reciprocatory up-and-down motion within a preload cylinder 804, the latter cylinder being provided with an appropriate mounting flange 806 for securing it to the supporting frame. The piston head 808 is sealable to the cylinder head 809 by means of O-ring 810 when the piston head is urged upwardly against the cylinder head, and the upper surface of the piston head is vented to atmosphere by way of aperture 812.

In this embodiment the piston rod 802 extends downwardly through a sealed support 814 into a lower pneumatic cylinder 816. The upper cylinder 804 and the lower cylinder 816 are independently pressurizable by means of separate air inlets 818 and 820, respectively, connected by way of pressure gauges 822 and 824 and pressure control valves 826 and 828, respectively, to a source 830 of pressurized air. Operation of valve 826 enables application of any desired pneumatic preload force to the piston head 808 to make it non-responsive to shocks in any desired lower range of magnitudes but responsive to shocks in excess of a predetermined minimum magnitude. This pressure in the upper chamber does not produce any resetting effect because the piston rod extends entirely through the upper chamber. However, since the piston rod extends into, and terminates within, the lower chamber 816, the pressure supplied to the lower chamber provides a resetting pneumatic pressure of spring-like nature, the magnitude of which is adjustable by adjustment of valves 828. Thus, positive pressure in lower cylinder 816 produces an unbalanced upwardly-directed force on piston rod 802, this force being larger the greater the protrusion of the piston rod into the lower chamber because of the resultant increase in displacement of air by the piston rod and the resultant increase of pressure in the lower cylinder. The lower cylinder therefore has the characteristic of producing an increasing upward force on piston rod 802 with increasing downward displacement of the rod, which corresponds to the characteristic of a spring. The pressure in the lower cylinder 816 is ordinarily set at a value just sufficient to assure that the piston assembly and load can be raised to its uppermost position, the main preload pressure being supplied by air in the upper cylinder 804.

To cushion shock upon resetting of the piston head 808 against the lower surface of cylinder head 809, a unilaterally-acting damping arrangement 850 is preferably provided at the lower end of the piston rod 802 within the lower cylinder 816. In the present embodiment the damper consists of a plug 852 of cylindrical form fitting closely within the inner walls of lower cylinder 816 and having a plurality of holes such as 854 through it. Each hole 854 is covered on its top surface with a light, flexible flapper valve 856 which opens readily in response to light air pressures acting upwardly against its lower surface, but which closes to seal the holes in response to slight downward pressures exerted on the top surface thereof; other forms of valve, such as conventional check valves, may be used in place of the flapper valves. When the piston rod 802 is to move downwardly in response to severe shocks with respect to cylinder 816, the flapper valves open and the plug 852 presents little air resistance to the downward motion; however, when the piston moves upwardly toward its fully reset position; the resultant air flow causes the flapper valve to close, leaving only the small region around the periphery of the plug 852 for escape of trapped air above the plug, resulting in a viscous damping of the reset motion and cushioning of the reset shock.

FIGURE 15 illustrates, merely by way of example, one pneumatic system which may be utilized in supplying pneumatic pressure to one or more shock isolators in accordance with the invention. In this arrangement, a pneumatic pump 900 builds up air pressure within a supply tank 902 provided with a suitable pressure gauge 904, an outlet from tank 902 being connected through a demand valve 905 to a plurality of identical parallel arrangements for supplying each isolator. Each such parallel arrangement may comprise, in series, a pneumatic fuse 906, a pressure-reducing valve 908, a restrictor 910 and a check valve 912 for supplying the shock isolator such as 914 with air pressure. Since such arrangements and the elements thereof are well understood in the art, no detailed description of the elements or of their operation will be given here.

There have therefore been described a variety of forms of apparatus in which a load is normally supported in a frame by means of a pneumatic seal which is preloaded to cause the load to move with the frame under ordinary conditions, but which is opened by a shock in excess of a predetermined minimum magnitude applied to the frame, whereby the load is freed from the frame following the initial portion of the severe shock, remains floating or poised in space during the remainder of the severe shock, and is subjected only to small shocks on reset or overtravel. Various arrangements are also shown for providing automatic resetting of the apparatus. Some of the embodiments provide a high degree of automatic operation with minimum maintenance while others emphasize simplicity, reliability or flexibility of adjustment and operation, depending upon the purposes to which the apparatus is to be put.

In addition, certain forms of the invention, such as that shown in FIGURE 4, are particularly well-adapted for use in applications in which the shocks to be protected against are directed other than upwardly, for example horizontally. FIGURE 16 shows such an application, in which a railroad car 1000 adapted to roll on rails 1002 has a main frame 1004 on which a load bed 1006 is mounted to slide readily lengthwise of the car in guideways 1008. Flanges 1010 and 1012 are mounted across the car at one end, and flanges 1014 and 1016 at the opposite end to provide vertical surfaces fixed to the main frame 1004. Shock isolators 1020, 1022, 1024 and 1026 are mounted between flanges 1010, 1012, 1014 and 1016, respectively, and the adjacent ends of the load bed. Each isolator may be of the type shown in FIGURE 4, each including the bellows type of damper shown in the latter figure, but the telescoping outer cylinder 50 of FIGURE 4 has been omitted, since it is not necessary in this application, and replaced by a transverse plate at the end of the piston rod.

More particularly, the pressure cylinders 34 are mounted against their respective flanges 1010, 1012, 1014 and 1016, the flanges being positioned lengthwise of the car so that the plates 1030, 1032, 1034, 1036 are spaced only very slightly from the adjacent ends of the load bed when the piston heads in the cylinders are sealed to their respective cylinder heads. With the isolators properly pressurized, the load bed is therefore held in the position shown. Small shocks, such as are produced by normal impact of another car against car 1000 during "humping" operaions, do not release the isolator piston heads, because of the pneumatic preload supplied.

However, when car 1000 is struck, from the left in FIGURE 16, by another car with an unusually severe impact which might damage a load on the load bed, the piston heads in isolators 1024 and 1026 on the right side of the load bed are released. The bellows-type buffers in the latter isolators subsequently strike the internal shoulders provided therefore as discussed in connection with FIGURE 4, and act as viscous dashpots to cushion the shock delivered to the load bed. After the shock is done, the pneumatic pressure automatically resets the piston heads and returns the load bed to its reference position with respect to the car. Similar action is provided by isolators 1020 and 1022 in response to severe shocks from the opposite direction. Reset forces need be only great enough to overcome the frictional resistance to motion of the load bed. This system provides shock control which is easily and precisely adaptable to protect loads of widely differing mass and fragility, by suitable adjustment of the pneumatic preload pressure.

In other applications the member to which shock is first applied may extend through the other member to which it transmits shock and may form a seal to the opposite side of the other member; e.g. the frame may be connected directly to the piston rod and the cylinder used to support the load instead of vice verse.

While the invention has been described with particular reference to specific embodiments thereof in the interests of complete definiteness, it will be understood that it is in no way limited to such embodiments but may take any of a large number of forms diverse from those specifically described without departing from the scope and spirit of the invention.

I claim:

1. Apparatus for reducing the effects on a load of shocks of predetermined minimum magnitude, comprising:
   a frame subject to shock;
   means movable with respect to said frame for supporting said load on said frame; and
   pressurized pneumatic seal means between said frame and said movable means for normally locking said movable means to said frame and cause said movable means to move with said frame in the absence of shock of said predetermined minimum magnitude applied to said frame, said pneumatic seal means being responsive to shock of at least said predetermined minimum magnitude applied to said frame to open and permit subsequent easy movement of said movable means with respect to said frame.

2. The apparatus of claim 1, in which said seal means comprises a first sealing surface connected to said frame and a second sealing surface connected to said movable means for mating with said first sealing surface to form a pneumatic seal, said apparatus comprising means for applying a superatmosphere pneumatic pressure to said movable member on one side of said pneumatic seal and for maintaining a pneumatic pressure smaller than said superatmosphere pressure on the opposite side of said pneumatic seal when said first and second sealing surfaces are in contact with each other, thereby to lock together said frame and said movable member with a predetermined force during shocks of less than said predetermined magnitude.

3. The apparatus of claim 2, comprising means connecting said opposite side of said seal to atmosphere when said first and second sealing surfaces are in contact with each other and responsive to separation of said first and second sealing surfaces to close said aperture means.

4. The apparatus of claim 3, comprising means for returning said first and second sealing surfaces to mating relationship in the absence of substantial shock applied to said frame.

5. The apparatus of claim 4 in which said returning means comprises a pressurizable chamber and an element integral with said movable member having one end inside and another end outside said chamber for urging said first and second sealing means toward mating relationship in response to pneumatic pressure in said chamber.

6. Shock isolating apparatus for reducing the effect on a load of a shock which exerts a directional component of force of more than a predetermined minimum magnitude against one side of a frame supporting said load, comprising:
   a frame;
   a member for supporting said load on said frame, at least a portion of said member extending on the same side of said frame as that to which said shock component is to be applied, means for mounting said member for easy motion along the direction of said shock component between a first position in which said portion of said member bears against said side of said frame and a second portion in which said portion does not bear against said side of said frame; and means for applying a predetermined pneumatic pressure differential to said portion of said member when said member is in said first position to urge said portion of said member against said side of said frame, and for reducing said pressure differential rapidly when said frame is caused to move away from said portion of said member by the initial portion of said shock component;

said predetermined pneumatic pressure differential being sufficient to hold said portion of said member against said side of said frame during shocks the components of which along said direction are substantially less than said predetermined minimum magnitude, but being insufficient to prevent movement of said portion of said member away from said side of said frame in response to said initial portion of said shock component of more than said predetermined magnitude;

whereby said load is constrained to move with said frame in response to said shock components of less than said predetermined minimum magnitude but is substantially isolated from said frame during a substantial portion of said shock component of more than said predetermined minimum magnitude.

7. The apparatus of claim 6, in which said member comprises a piston reciprocably mounted with respect to said frame and having a head portion forming a pneumatic seal to the periphery of a portion of said one side of said frame when said member is in said first position.

8. The apparatus of claim 7, in which said means for applying pneumatic pressure comprises a pressurized chamber communicating with one side of said piston head, means for producing an elevated pneumatic pressure in said chamber, and aperture means in said portion of said frame for maintaining a pressure on the other side of said piston head portion which is lower than said elevated pressure when said piston is in said first position.

9. The apparatus of claim 8, in which said piston head portion and said frame portion are shaped adjacent said seal to facilitate rapid flow of said gas through said seal when said seal is initially broken by motion of said member from said first position toward said second position.

10. The apparatus of claim 6, comprising valve means responsive to motion of said member to supply pressurized gas to one side of said portion of said member when said member is in said one position and for cutting off said supplying of gas when said member moves toward said second position.

11. The apparatus of claim 6, comprising return means acting between said frame and said member for urging said member toward said first position thereof with a force sufficient to move said member to said first position in the absence of substantial shock to said frame.

12. The apparatus of claim 11, in which said return means comprises a mechanical spring.

13. The apparatus of claim 11, in which said return means comprises means for applying an unbalanced pneumatic pressure to said member when it is spaced away from said frame, said unbalanced pneumatic pressure being substantially smaller than said pneumatic pressure differential.

14. The apparatus of claim 11, in which said return means is of a strength to urge said member toward said first position with a force in itself insufficient to insure holding of said member in said first position during lesser shocks having components along said direction which are smaller than said predetermined minimum magnitude, but sufficient together with said pneumatic pressure differential to hold said member in said first position during said lesser shocks.

15. The apparatus of claim 6, comprising valve means responsive to motion of said member to supply pressurized gas to one side of said portion of said member when said member is in said one position and for cutting off said supply of gas when said member is moved toward said second position, and return means acting between said frame and said member for urging said member toward said first position thereof with a force sufficient to move said member to said first position in the absence of substantial shock to said frame, said force exerted by said return means in itself being insufficient to insure holding of said member in said first position during lesser shocks having components along said direction which are smaller than said predetermined minimum magnitude, but sufficient together with said pneumatic pressure to hold said member in said first position during said lesser shocks.

16. Apparatus for reducing the effect on a load of shock applied to a frame supporting said load, comprising:

a pressurized chamber;
means for securing said chamber to a supporting frame;
a piston reciprocable in said chamber and having a piston-head portion in said chamber;
a load-supporting member secured to said piston and extending outside said chamber;
means for providing a pneumatic seal between said piston-head portion and an interior top portion of said chamber when said piston-head portion is in its uppermost position in said chamber;
means for venting to atmosphere the portion of the interior of said chamber adjacent said top portion of said chamber and above said piston-head portion; and
pressurizing-gas inlet means for said chamber, communicating with said chamber outside said top portion thereof, for enabling the supply of pressurized gas to said chamber;
whereby said piston-head portion, when in said uppermost position, is maintained in said position with respect to said chamber by said pressurized gas despite minor shocks to said chamber, but is released from said position in response to the initial portion of a shock applied to said chamber having a component of greater than a predetermined magnitude along the upward direction of reciprocation of said piston.

17. The apparatus of claim 16, comprising valve means in said inlet means actuatable in response to movement of said piston-head portion to said uppermost position to be opened, and responsive to motion of said piston-head portion downward from said uppermost position to be closed.

18. The apparatus of claim 16, comprising return means acting between said chamber and said piston for moving said piston-head portion to said uppermost position.

19. The apparatus of claim 18, in which said return means comprises mechanical spring means.

20. The apparatus of claim 18, in which said return means comprises another pressurizable chamber, means for maintaining a positive gas pressure in said other chamber, and a plunger connected to said piston and extending into said other chamber to an increasing extent as said piston moves downwardly relative to said first chamber.

21. Apparatus for reducing the effects of shock on objects, comprising:
reciprocable means for supporting said objects;
supporting means for supporting said reciprocable means for easy reciprocating motion with respect to said supporting means between a first position in which said reciprocable means bears against said supporting means and a second position in which it is spaced from said supporting means;
pneumatic pressure means for normally applying a predetermined pneumatic pressure to urge said reciprocable means against said supporting means with a predetermined force in the absence of shock applied to said supporting means, so that said reciprocable means moves with said supporting means; and means responsive to the initial portion of an accelerative shock of more than a predetermined minimum magnitude applied to said supporting means to reduce said pressure rapidly, thereby substantially to isolate said reciprocable means for later-occurring portions of said shock.

22. The apparatus of claim 21, in which said reciprocable means comprises a piston-head portion forming a pneumatic seal with a portion of the lower side of said supporting means when said reciprocable means is in said first position but not when it is in said second position; in which said pneumatic pressure means comprises a pressurizable chamber encompassing said piston-head portion and means for supplying gas under pressure to said chamber; and in which said means responsive to the initial portion of said shock comprises valve means responsive to motion of said reciprocable means to said first position to permit said supplying of gas and responsive to motion of said reciprocable means to said second position to block said supplying of gas, and exhaust vent means within said portion of said lower side of said supporting means for producing an upward pneumatic pressure on said piston-head portion when said reciprocable means is in said first position and for venting said chamber when said reciprocable means moves toward said second position to reduce the pressure in said chamber.

23. The apparatus of claim 22, comprising spring-like restoring means for urging said reciprocable means toward said first position from said second position.

24. Apparatus for reducing the effects on a load of shocks of a predetermined minimum magnitude, comprising:

a frame subject to shock;

means movable in a horizontal direction with respect to said frame for connecting said frame to said load; and normally-pressurized pneumatic seal means acting between said movable means and said frame for normally moving said movable means with said frame in the absence of shock of said predetermined minimum magnitude applied to said frame, said pneumatic seal means being responsive to shock of at least said predetermined minimum magnitude applied to said frame to open and permit subsequent easy movement of said movable means along said direction with respect to said frame.

25. Apparatus for reducing the effects on a first member of forces of greater than a predetermined magnitude applied to a second member mechanically coupled to said first member, comprising:

normally-pressurized pneumatic seal means normally connecting said first and second members to cause said first member to move in response to motion of said second member; and means responsive to force in excess of a predetermined minimum magnitude applied to said second member to open said seal means and permit relative motion between said members.

References Cited

UNITED STATES PATENTS

| | | | |
|---|---|---|---|
| 3,193,239 | 7/1965 | Monroe | 248—400 |
| 3,227,435 | 1/1966 | Greer | 267—1 |
| 3,233,886 | 2/1966 | Saffell et al. | 248—22 X |
| 3,249,330 | 5/1966 | Preis | 248—358 |
| 3,351,314 | 11/1967 | Hirsch et al. | 248—358 |

ROY D. FRAZIER, Primary Examiner

J. F. FOSS, Assistant Examiner

U.S. Cl. X.R.

188—88; 248—15, 358; 267—1